United States Patent
Gupta et al.

(10) Patent No.: US 12,431,935 B2
(45) Date of Patent: Sep. 30, 2025

(54) SYSTEM AND DESIGN METHOD OF INTEGRATED MACRO NEXT GENERATION RADIO UNIT

(71) Applicant: JIO PLATFORMS LIMITED, Ahmedabad (IN)

(72) Inventors: Deepak Gupta, Navi Mumbai (IN); Nekiram Khosya, Dombivali (IN); Amrish Bansal, Navi Mumbai (IN); Brijesh Shah, Navi Mumbai (IN); Renuka Nair, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,477

(22) PCT Filed: Mar. 24, 2023

(86) PCT No.: PCT/IB2023/052928
§ 371 (c)(1),
(2) Date: Mar. 31, 2023

(87) PCT Pub. No.: WO2023/187576
PCT Pub. Date: Oct. 5, 2023

(65) Prior Publication Data
US 2025/0015827 A1 Jan. 9, 2025

(30) Foreign Application Priority Data
Mar. 31, 2022 (IN) .............. 202221019660

(51) Int. Cl.
*H04B 1/40* (2015.01)
*H04B 1/04* (2006.01)

(52) U.S. Cl.
CPC ....... *H04B 1/40* (2013.01); *H04B 2001/0425* (2013.01)

(58) Field of Classification Search
CPC .................. H04B 1/40; H04B 2001/0425
(Continued)

(56) References Cited

U.S. PATENT DOCUMENTS 10,355,344 B1* 7/2019 Ruaro .............. H01Q 3/24
11,228,328 B1 1/2022 Veyseh et al.
(Continued)

FOREIGN PATENT DOCUMENTS

CN 101094460 A 12/2007
CN 110198174 A 9/2019
(Continued)

OTHER PUBLICATIONS

International Search Report, ISRPCT/IB2023/052928, mailed Jul. 4, 2023, Total pp. 03.

*Primary Examiner* — April G Gonzales
(74) *Attorney, Agent, or Firm* — FINNEGAN, HENDERSON FARABOW, GARRETT & DUNNER, LLP

(57) ABSTRACT

The present disclosure relates to a 5G next generation integrated macro radio unit. The integrated radio unit includes an integrated baseband and transceiver board (IBTB) and a radio frequency front end board (RFEB), where the RFEB is operatively coupled with the IBTB. The IBTB includes at least a baseband processor, a transceiver, and a clock synchronization module. The RFEB includes one or more RF chains to receive RF signals from the IBTB. Further, the RFEB blind mates with the IBTB through one or more RF connectors.

12 Claims, 6 Drawing Sheets

(58) Field of Classification Search
USPC ...................................................... 455/550.1
See application file for complete search history.

(56) References Cited

U.S. PATENT DOCUMENTS

| | | | |
|---|---|---|---|
| 11,765,380 B2* | 9/2023 | Chiu | H04N 19/51 |
| | | | 375/240.15 |
| 2004/0172524 A1* | 9/2004 | Hoogerbrugge | G06F 9/322 |
| | | | 712/238 |
| 2005/0119025 A1* | 6/2005 | Mohindra | H04B 1/0021 |
| | | | 455/88 |
| 2007/0190952 A1* | 8/2007 | Waheed | H03F 1/3241 |
| | | | 455/114.3 |
| 2010/0109798 A1* | 5/2010 | Chu | H04B 1/18 |
| | | | 333/32 |
| 2010/0248660 A1* | 9/2010 | Bavisi | H04B 1/0458 |
| | | | 455/120 |
| 2012/0044840 A1* | 2/2012 | Peng | H05K 7/20409 |
| | | | 370/277 |
| 2016/0007488 A1* | 1/2016 | Neustadt | H01Q 1/246 |
| | | | 174/541 |
| 2016/0191227 A1* | 6/2016 | Pagano | H04B 7/0413 |
| | | | 370/281 |
| 2020/0091608 A1 | 3/2020 | Alpman et al. | |
| 2021/0297110 A1* | 9/2021 | Braun | H04B 1/04 |

FOREIGN PATENT DOCUMENTS

CN          110401976 A    11/2019
EP            3560111 A2    10/2019

* cited by examiner

SYSTEM AND DESIGN METHOD OF INTEGRATED MACRO NEXT GENERATION RADIO UNIT

RESERVATION OF RIGHTS

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present disclosure relates generally to network devices, and more particularly to design and architecture of an integrated next generation radio unit.

BACKGROUND OF INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The Fifth Generation (5G) communications system is considered to be implemented in sub 6 gigahertz (GHZ) and higher frequency (millimeter (mm) wave) bands, for example, 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed for use in 5G communication systems.

In general, 5G new radio (NR) next generation radio unit or base station (gNB) is a high power gNB. However, existing systems implementing 5G NR gNB suffer from lack of optimal integration due to design and manufacturing of individual components by different manufactures. In addition, the existing 5G NR gNB has further shortcomings in terms of the overall layout and interconnection of various sub-components there within.

Therefore, there is a well-felt need for an improved and efficient 5G NR integrated Macro gNB that addresses at least the above-mentioned issues and shortcomings.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to an integrated radio unit. The integrated radio unit includes an integrated baseband and transceiver board (IBTB) and a radio frequency front end board (RFEB) operatively coupled with the IBTB. The IBTB includes at least a baseband processor, a transceiver, and a clock synchronization module, and the RFEB includes one or more RF chains to receive RF signals from the IBTB. The RFEB blind mates with the IBTB through one or more RF connectors.

In an embodiment, the integrated radio unit includes one or more cavity filters, and an interface for one or more antennas. In an embodiment, the one or more cavity filters are configured between each of said one or more RF chains of the RFEB and the one or more antennas.

In an embodiment, the one or more antennas are connected to the RFEB with one or more jumper RF cables.

In an embodiment, the one or more RF chains comprises one or more transmit chains and one or more receive chains. In an embodiment, each RF chain carries matching Balun, Pre-Driver amplifier, and final RF power amplifier as final stage Power Amplifier (PA). In an embodiment, each receive chain carries low noise amplifier band pass SAW filter and a matching network.

In an embodiment, the IBTB is configured to receive an external voltage, down convert the external voltage to a first voltage using isolated power supply, and down convert the first voltage to a second voltage using non-isolated power supply.

In an embodiment, the IBTB includes a power management integrated chipset, one or more DC-DC converters, and one or more low dropout (LDO) regulator devices for generating the first voltage and the second voltage.

In an embodiment, the IBTB is configured to self-heal from a fault generation.

In an embodiment, the IBTB includes one or more sensors to provide a thermal profile of the IBTB.

In an embodiment, the clock synchronization module includes a system synchronizer and clock generator circuit.

In another aspect, the present disclosure relates to an apparatus including the proposed integrated radio unit.

In another aspect, the present disclosure relates to a user equipment (UE) communicatively coupled with the proposed integrated radio unit. The UE is configured to receive a connection request from the integrated radio unit, send an acknowledgment of the connection request to the integrated radio unit, and in response, transmit a plurality of signals.

In an aspect, the present disclosure relates to a non-transitory computer readable medium including processor-executable instructions that cause a processor to receive a connection request from an integrated radio unit, send an acknowledgment of the connection request to the integrated radio unit, and in response, transmit a plurality of signals, wherein the integrated radio unit includes an integrated baseband and transceiver board (IBTB), said IBTB including at least a baseband processor, a transceiver, and a clock synchronization module, and a radio frequency front end board (RFEB) operatively coupled with the IBTB, said RFEB including one or more RF chains to receive RF signals from the IBTB, where the RFEB blind mates with the IBTB through one or more RF connectors.

OBJECTS OF THE INVENTION

An object of the present disclosure is to provide an integrated system having an integrated baseband and transceiver board and a radio frequency front end board.

An object of the present disclosure is to implement a hybrid design approach to cater the capacity of outdoor small cell (ODSC) and coverage of Massive MIMO Radio Unit (MRU) for rural and sub-urban areas.

An object of the present disclosure is to implement an all-in-one class design having Physical layer, Medium Access Control layer, and Application layer along with complete mechanical housing in a single enclosure.

An object of the present disclosure is to accommodate complex radio frequency and digital signal routing in a radio frequency front end board.

An object of the present disclosure is to provide an integrated system having a cable-less design.

An object of the present disclosure is to maintain uniform radio frequency output across a specified temperature range.

An object of the present disclosure is to self-heal the system from software corruption and any other unwanted failure from software faults.

An object of the present disclosure is to provide a power efficient system having unique power supply design, which includes isolated power supply design and non-isolated power supply design.

An object of the present disclosure is to enable closed loop monitoring and controlling output radio frequency power on each antenna port based on an ambient temperature.

An object of the present disclosure is to provide a hardware architecture and design of 4T4R-based 5G integrated macro gNB for standalone mode, wherein the proposed 5G integrated macro gNB is an all-in-one unit including baseband, radio frequency (RF), and antenna units in a single enclosure for easy and efficient installation.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
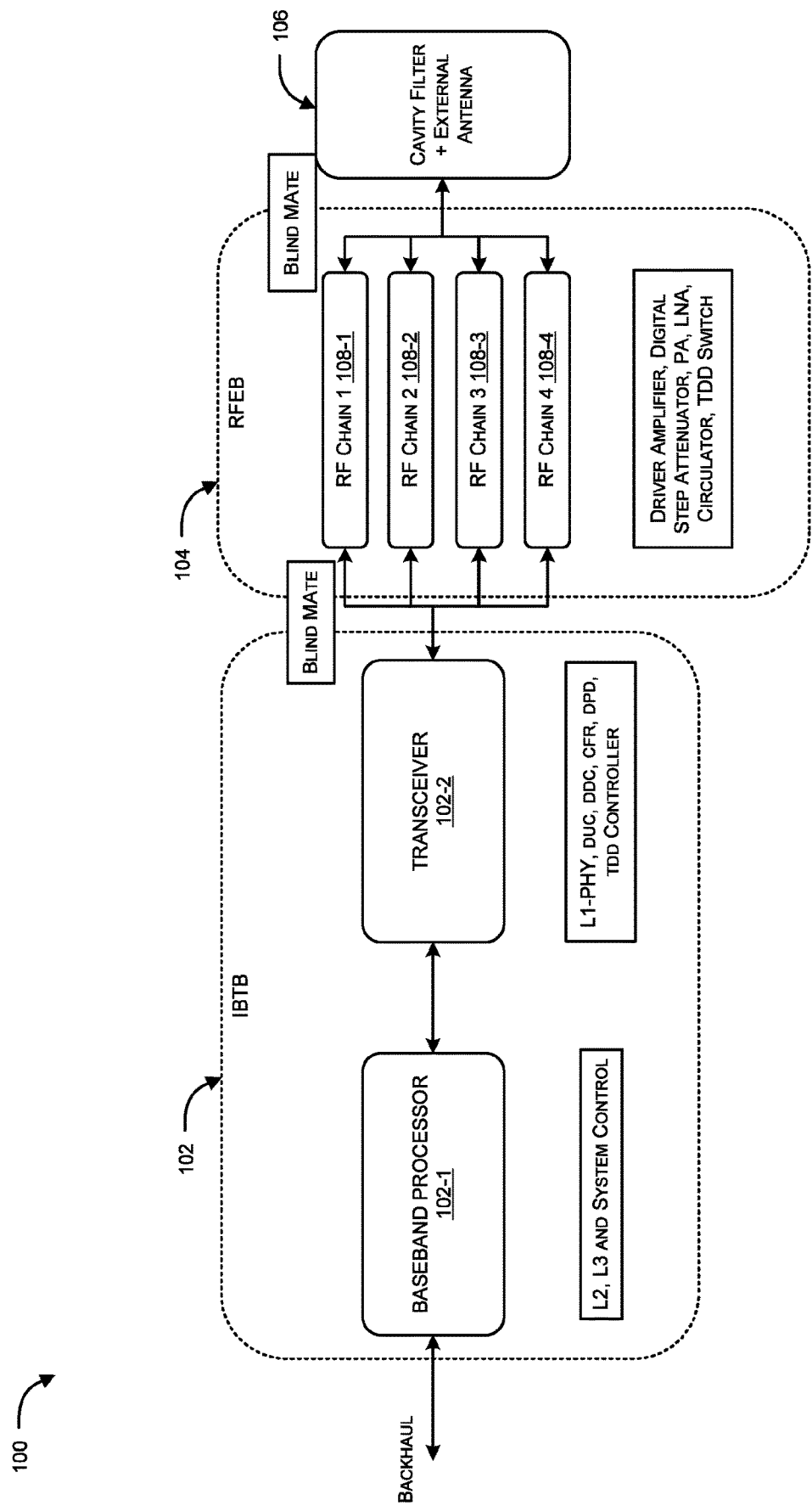
FIG. 1 illustrates an exemplary design architecture of an integrated next generation radio unit, in accordance with embodiments of the present disclosure.

The foregoing shall be more apparent from the following more detailed description of the disclosure.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be 25 shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (for example, 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5th generation node (5G node)," "next generation NodeB (gNB)," "wireless point," "transmission/reception point (TRP)," or other terms having equivalent technical meanings.

Certain terms and phrases have been used throughout the disclosure and will have the following meanings in the context of the ongoing disclosure.

The term "Multiple-Input/Multiple-Output (MIMO)" may refer to a wireless technology that uses multiple transmitters and receivers to transfer more data at the same time.

The term "massive MIMO" may refer to type of wireless communications technology in which base stations are equipped with a very large number of antenna elements to improve spectral and energy efficiency.

The term "Orthogonal Frequency Division Multiplexing (OFDM)" may refer to a method of data transmission where a single information stream is split among several closely spaced narrowband sub-channel frequencies.

The term "blind mate" or "blind mating" or "blind mate conditions" or "blind mate connectors" may refer to connectors in which the mating is done via a sliding or snapping action and are constructed with a self-aligning feature. Further, blind mate conditions are used where the connection area is hidden from viewing or cannot be reached for alignment. It should be understood that the terms "blind mate," "blind mating," "blind mate conditions," and "blind mate connectors" are used interchangeably throughout the disclosure.

The term "4T4R" may refer to transmit and receive mode for base stations with four transmit and four receive antennas.

The term "digital pre-distortion (DPD)" may refer to a method by which one first stimulates a non-linear power amplifier (PA) with baseband samples and then observes the result of that stimulus at its output.

The term "small form-factor pluggable (SFP)" may refer to a compact, hot-pluggable network interface module format used for both telecommunication and data communications applications.

The term "phase-locked loop (PLL)" or "phase lock loop (PLL)" may refer to a feedback circuit designed to allow one circuit board to synchronize the phase of its on board clock with an external timing signal. PLL circuits operate by comparing the phase of an external signal to the phase of a clock signal produced by a voltage controlled crystal oscillator (VCXO).

The present disclosure relates to 5G new radio (NR) integrated macro next generation NodeB (gNB). In an exemplary and non-limiting embodiment, the present disclosure provides a hardware architecture and design of 4T4R-based 5G integrated macro gNB for standalone mode, wherein the proposed 5G integrated macro gNB is an all-in-one unit including baseband, radio frequency (RF), and antenna units in a single enclosure for easy and efficient installation. A person of ordinary skill in the art will understand that 4T4R is transmit and receive mode for base stations with four transmit and four receive antennas.

In an embodiment, the proposed 5G integrated macro gNB caters to the capacity of outdoor small cell (ODSC) and coverage of massive multiple-input/multiple-output (MIMO) radio unit (MRU) for rural and sub-urban areas. In an embodiment, the proposed 5G integrated macro gNB comprises an integrated baseband and transceiver board (IBTB), a radio frequency front end board (RFEB), cavity filter(s), and interface(s) for external antenna(s) as part of a single enclosure/unit for easy and efficient installation.

In an embodiment, the IBTB includes a baseband processor and a transceiver. Further, the IBTB includes a clock synchronization circuit/module, which comprises a system synchronizer integrated circuit (IC) and clock generators. In an embodiment, the RFEB comprises one or more RF chains, wherein each RF chain is connected to one or more external antennas through the cavity filter(s). Further, the IBTB and the RFEB are blind-mated. A person of ordinary skill in the art will understand that blind mating or blind mate connectors may be referred to as connectors in which the mating is done via a sliding or snapping action and are constructed with a self-aligning feature. Further, blind mate conditions are used where the connection area is hidden from viewing or cannot be reached for alignment. Thus, the proposed 5G integrated macro gNB utilizes blind mate conditions for connecting the IBTB and the RFEB, and the like, making it a cable-less design architecture.

It is however to be appreciated that design and architecture of each of the components/units of the proposed node is novel and inventive as regards the proposed invention is concerned and hence each would be protected through a respective patent application.

The various embodiments throughout the disclosure will be explained in more detail with reference to FIGS. 1-6.

FIG. 1 illustrates an exemplary design architecture of an integrated next generation radio unit, i.e., 5G integrated macro gNB 100, in accordance with embodiments of the present disclosure. It should be understood that the terms "5G integrated macro gNB," "radio unit," or "5G integrated macro node" may be used interchangeably throughout the disclosure.

Referring to FIG. 1, the proposed 5G integrated macro gNB 100 may be implemented as a seamless integration of one or more sections. The one or more sections may include, but are not limited to, an integrated baseband and transceiver board (IBTB) 102, an RF frond end board (RFEB) 104, and a cavity filter and an interface for external antenna(s) 106.

In an embodiment, the IBTB 102 includes a baseband processor (or, network processor) 102-1 and a transceiver 102-2. It should be understood that the terms "baseband processor" and "network processor" may be used interchangeably throughout the disclosure.

In an embodiment, L2 and L3 layer development and system control may be implemented/undertaken in the baseband processor 102-1. In an embodiment, the baseband processor 102-1 may be connected to the transceiver 102-2, and configured to control the transceiver 102-2 to transmit and receive signals. In an embodiment, the baseband processor 102-1 may be configured to control the transceiver 102-2 to transmit and receive signals of 5G Sub-6 GHz band. Additionally, the baseband processor 102-1 may perform MIMO or diversity through a backhaul connection.

In an embodiment, the baseband processor 102-1 may include a modem processor (e.g., digital signal processor (DSP)) that performs the digital baseband signal processing and a protocol stack processor (e.g., a central processing unit (CPU) or a memory protection unit (MPU)) that performs the control-plane processing.

Referring to FIG. 1, L1 Physical (PHY) layer development and bit stream generation may be implemented/undertaken in the transceiver 102-2. As shown in FIG. 1, the transceiver 102-2 is coupled to the baseband processor 102-1 and the RFEB 104. In an embodiment, the transceiver 102-2 may include, but not be limited to, commercial grade field programmable gate arrays (FPGAs). It should be understood that any other equivalent transceiver is fully within the scope of the present disclosure, and therefore scope of FPGA should be treated as that of any transceiver or technically equivalent component such as an application-specific integrated circuit (ASIC). In an embediment, the transceiver 102-2 may include a plurality of transceivers.

In an embodiment, the transceiver 102-2 may include digital up-converter (DUC) for frequency up-conversion and digital down-converter (DDC) for frequency down-conversion. The selection and design of the DUC and DDC blocks may be compared and optimized to match to the spectral mask requirements mentioned in the 3GPP standards. Further, in an embodiment, the transceiver 102-2 may utilise crest factor reduction (CFR) schemes to reduce the Peak to Average Power Ratio (PAPR) of an incoming signal. Furthermore, in an embodiment, the transceiver 102-2 may implement digital pre-distortion (DPD). It should be understood that DPD may refer to a method by which one first stimulates a non-linear power amplifier (PA) with baseband samples and then observes the result of that stimulus at its output. Additionally, the transceiver 102-2 may include a controller for time division duplexing (TDD).

In an embodiment, the transceiver 102-2 may receive modulated symbol data from the baseband processor 102-1, generate a transmission RF signal, and supply the transmission RF signal to the RFEB 104. Further, the transceiver 102-2 may generate a baseband reception signal based on a reception RF signal received from the RFEB 104 and supply the baseband reception signal to the baseband processor 102-1. Alternatively, or additionally, the transceiver 102-2 may include an analog beamformer circuit (not shown) for beam forming. The analog beamformer circuit may include, for example, a plurality of phase shifters and a plurality of power amplifiers.

Referring to FIG. 1, the RFEB 104 may be coupled to the IBTB 102 through blind mate conditions. In an embodiment, the RFEB 104 may receive control signals (RF signals) from the IBTB 102 (for example, the transceiver 102-2) along with a power supply through a connector. The RFEB 104 may be configured to act as a signal extended so as to incorporate 4 RF chains (108-1, 108-2, 108-3, 108-4) including 4 transmit chains for signal transmission, 4 receive chains for signal reception, and 4 observation chains that can act as DPD feedback paths from power amplifiers (PAs) to the transceiver 102-2 for linearization.

In an embodiment, the RFEB 104 may include driver amplifiers, digital step attenuator, power amplifiers (PAs), low noise amplifiers, circulators, or the like. In an embodiment, the RFEB 104 may include an RF TDD switch that can combine each transmit-receive pair. Further, referring to FIG. 1, cavity filter(s) 106 may be used between each RF switch of the RFEB 104 to antenna port(s). In an embodiment, the cavity filter(s) 106 may consist of 4-port cavity filter for 4T4R configuration, which provides steeper roll-off outside operating band.

In an embodiment, the unit 106, comprising the cavity filter(s) and the antenna(s), blind mates with the RFEB 104. Additionally, or alternatively, the one or more antenna(s) are connected to the RFEB 104 via jumper RF cables.

In an embodiment, the RFEB 104 may be configured to blind mate with the IBTB 102, thus removing the complexity of cable routing to avoid RF signal oscillations. The mating bullets/connectors provide robust connection between the IBTB 102 and the RFEB 104 to meet optimal design considerations. Similarly, the RFEB 104 may be configured to blind mate with the cavity filter(s) 106.

In an exemplary and non-limiting aspect of the present disclosure, the proposed 5G integrated macro gNB 100 is a 200 watt (W) high power gNB that operates in macro class (typically 50 W or 47 decibel-milliwatts (dBm) per antenna port), and is configured to provide macro-level wide-area solutions requiring good coverage and limited capacity, but still have low latency beneficial for rural and sub-urban areas. The proposed 5G integrated macro gNB 100 brings together an application layer, medium access control (MAC) layer, baseband layer based on baseband processor chipset (for example, 102-1), RF transceiver (for example, 102-2) based on ASIC transceiver, and RFEB (for example, 104) which includes RF high power amplifiers, low noise amplifiers (LNA), RF switch, and cavity filter(s)—all in a convection cooled passive enclosure and weighing less than 25 kilograms (kg). In an embodiment, the integrated macro gNB 100 can provide good coverage and capacity for dense urban clutter of high-rise buildings owing to 8 beams in the downlink and 4 beams in the uplink under multi user equipment (UE) scenarios. The proposed 5G integrated macro gNB 100 can be deployed as a hybrid solution for rural and sub-urban areas to meet the coverage and limited capacity requirements.

In another embodiment, the proposed 5G integrated radio unit 100 may be configured as a design with integrated cavity filter solution without requiring use of cable, making it a cable less design. The proposed radio unit 100 may be deployed in, but not limited to, tower sites, ground based towers (GBTs), and ground based masts (GBMs). Further, the proposed radio unit 100 may be deployed quickly so as to deliver high performance with low power consumption, making the radio unit 100 a power efficient solution. In an embodiment, the proposed radio unit 100 has a power consumption of 665 W that may significantly improve the operational expenditure. The proposed radio unit 100 may be connected to networks via two 10G fiber optic small form-factor pluggable (SFP) back haul interface, as shown in FIG. 1.

It should be appreciated that the proposed radio unit 100 meets all the RF performance requirements mentioned in 3GPP standard (TS 38.141) after integrating TDD based 5G NR integrated macro gNB with CFR and DPD modules in digital front end lineup. Further, the proposed radio unit 100 has low power consumption and thermally handled optimally by the IP65 ingress protected mechanical housing and printed circuit board (PCB) embedded copper coin technology to easily conduct heat through the boards.

Although FIG. 1 shows exemplary components of the 5G integrated macro gNB 100, in other embodiments, the radio unit 100 may include fewer components, different components, differently arranged components, or additional functional components than depicted in FIG. 1. Additionally, or alternatively, one or more components of the radio unit 100 may perform functions described as being performed by one or more other components of the radio unit 100.

Figure 2:
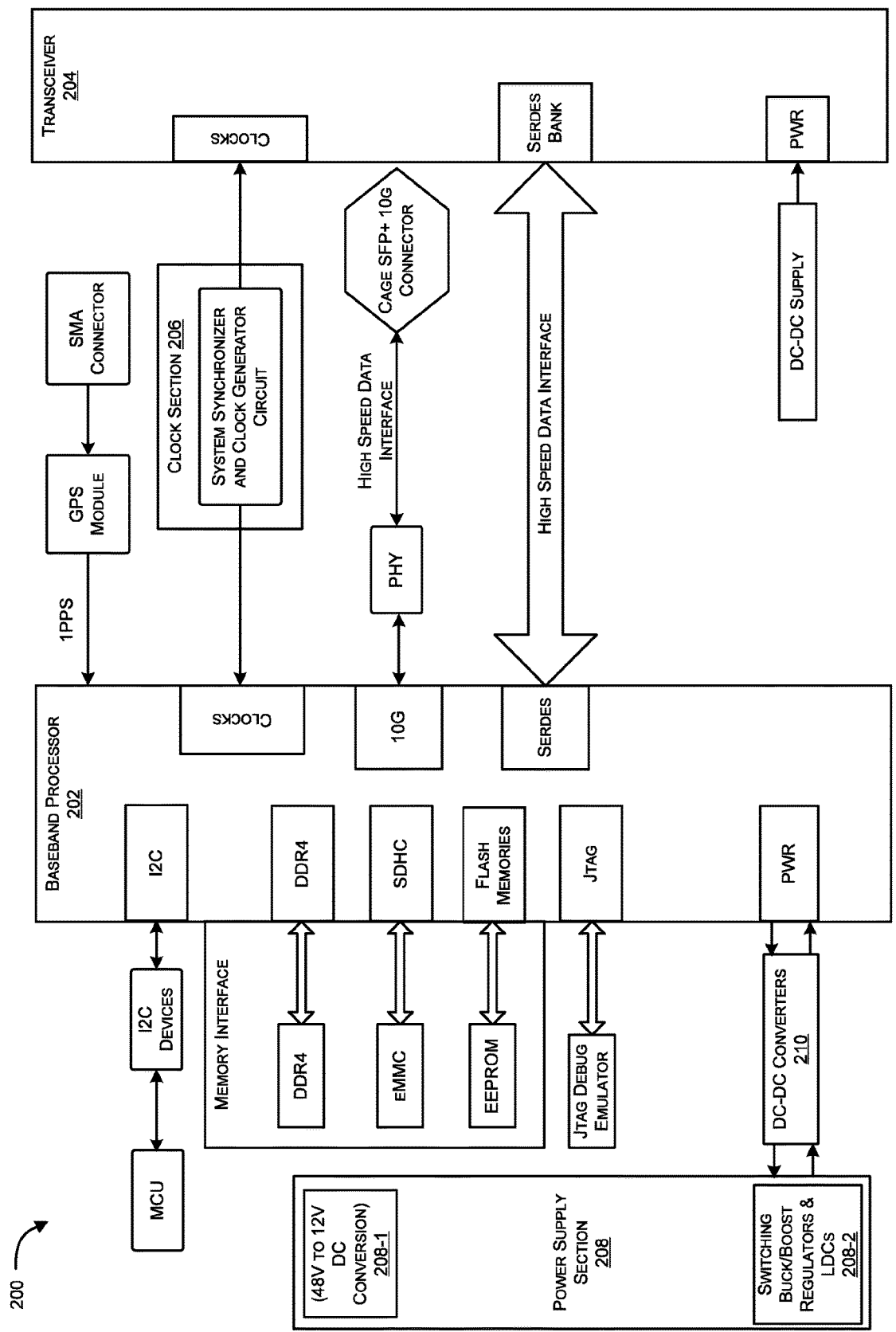
FIG. 2 illustrates an exemplary design architecture of an integrated baseband and transceiver board (IBTB), in accordance with embodiments of the present disclosure.

FIG. 2 illustrates an exemplary design architecture of an integrated baseband and transceiver board (IBTB) 200, in accordance with embodiments of the present disclosure. A person of ordinary skill in the art will understand that the IBTB 200 may be similar to the IBTB 102 of FIG. 1 in its functionality, and hence, may not be described again in detail for the sake of brevity.

In an embodiment, the IBTB 200 may include complex sub-systems such as digital high speed signals, switching power supplies, clock section and radio frequency signal, designed on 18 or more-Layer PCB. The PCB design includes unique design techniques to route RF signals and PCIe Gen 3.0 signals running on high speed 8 GT/s on adjacent layers and meet design specifications.

In an embodiment, the IBTB 200 may include a baseband processor 202, a transceiver 204, and a clock section 206. A person of ordinary skill in the art will understand that the baseband processor 202 and the transceiver 204 may be similar to the baseband processor 102-1 and the transceiver 102-2, respectively, in their functionality, and hence, may not be described in detail again for the sake of brevity.

In an embodiment, as described above, L2 and L3 layer development and system control may be implemented/undertaken in the baseband processor 202. In an embodiment, the baseband processor 202 may be connected to the transceiver 204, and configured to control the transceiver 204 to transmit and receive signals.

In an exemplary embodiment, the baseband processor 202 may perform digital baseband signal processing (i.e., data-plane processing) and control-plane processing for radio communication. The digital baseband signal processing may include (but not limited to) (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of orthogonal frequency division multiplexing (OFDM) symbol data (i.e., baseband OFDM signal) by inverse fast Fourier transform (IFFT). Meanwhile, the control-plane processing may include, but not be limited to, communication management of layer 1, L1 (e.g., transmission power control), layer 2, L2 (e.g., radio resource management and hybrid automatic repeat request (HARQ) processing), and layer 3, L3 (e.g., signaling regarding attach, mobility, and call management).

The digital baseband signal processing by the baseband processor 202 may include, for example, signal processing of a packet data convergence protocol (PDCP) layer, a radio link control (RLC) layer, a MAC layer, and a PHY layer. Further, the control-plane processing performed by the baseband processor 202 may include processing of a non-access stratum (NAS) protocol, a radio resource control (RRC) protocol, and MAC control elements (CEs). In an embodiment, the baseband processor 202 may perform MIMO encoding and pre-coding for beam forming.

In an embodiment, the baseband processor 202 may include a modem processor (e.g., DSP) that performs the digital baseband signal processing and a protocol stack processor (e.g., a CPU or an MPU) that performs the control-plane processing.

Further, in an embodiment, the L1 PHY layer development and bit stream generation may be implemented/undertaken in the transceiver 204. In an embodiment, the transceiver 204 may include, but not be limited to, commercial grade FPGAs. It should be understood that any other equivalent transceiver is fully within the scope of the present disclosure, and therefore scope of FPGA should be treated as that of any transceiver or technically equivalent component such as an ASIC. In an embedment, the transceiver 204 may include a plurality of transceivers.

In an embodiment, the transceiver 204 may perform analog RF signal processing. In an embodiment, the analog RF signal processing performed by the transceiver 204 may include, but not be limited to, frequency up-conversion, frequency down-conversion, and amplification. In an embodiment, the transceiver 204 may include one or more integrated circuits and associated electrical components. In an exemplary embodiment, the transceiver 204 may include a transmission integrated circuit, a reception integrated circuit, a switching circuit, an amplifier, and the like.

In an embodiment, the IBTB 200 may be configured to receive external −48 volt (V) input direct current (DC) voltage and down convert it to various lower voltages (such as to 28V and then 12V among other combinations as desired) based on requirements from different devices on board. Any or a combination of power supply section 208, DC-DC converters 210, or the like, may be used to generate these desired voltages. In an embodiment, the IBTB 200 may be configured to receive the external −48V input DC voltage. The IBTB 200 then down converts the received voltage to 28V using an isolated power supply and again down converts to 12V using a non-isolated power supply. In an embodiment, the power supply section 208 may include, but not be limited to, switching buck/boost regulators, low dropout (LDO) regulators, and the like.

In an embodiment, the complete system may be synchronized (using, for instance, a clock/synchronization section 206) within the IBTB 200. In an embodiment, the clock section 206 may include any or a combination of ultra-low noise clock generation phase locked loop (PLLs), a programmable oscillator, and a system synchronizer.

In an embodiment, the IBTB 200 may include one or more sensors such as, but not limited to, temperature sensors. In such embodiment, the unique design of the IBTB 200 enables the one or more sensors to measure the temperature of all sections in the IBTB 200, which provides a thermal profile of the complete board. The IBTB 200 also has the capability to take decision in case of thermal failure. In an embodiment, the unique design approach of the IBTB 200 has the capability to self-heal from any software corruption, or fault generation, which ensures that the system is not down due to software fault.

Although FIG. 2 shows exemplary components of the IBTB 200, in other embodiments, the IBTB 200 may include fewer components, different components, differently arranged components, or additional functional components than depicted in FIG. 2. Additionally, or alternatively, one or more components of the IBTB 200 may perform functions described as being performed by one or more other components of the IBTB 200.

Figure 3:
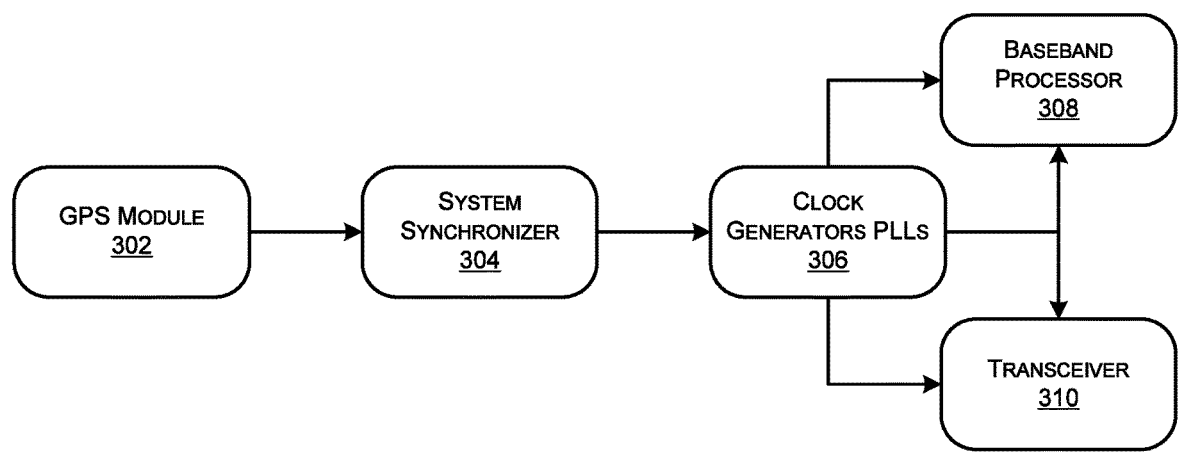
FIG. 3 illustrates an exemplary block diagram of a clock section in the IBTB, in accordance with embodiments of the present disclosure.

FIG. 3 illustrates an exemplary block diagram of the clock section 300 of the IBTB, in accordance with embodiments of the present disclosure. A person of ordinary skill in the art will understand that the clock section 300 may be similar to the clock section 206 of FIG. 2 in its functionality, and hence, may not be described in detail again for the sake of brevity.

In an embodiment, the complete system, i.e., the IBTB such as the IBTB 102 of FIG. 1 or IBTB 202 of FIG. 2 may be synchronized (using, for instance, a clock/synchronization section 300) within the IBTB. In an embodiment, the clock section 300 may include any or a combination of ultra-low noise clock generation PLLs, a programmable oscillator, and a system synchronizer.

In an embodiment, the clock section 300 may be an IEEE 1588v2 precision time-based protocol (PTP) based clock synchronization architecture using system synchronizer IC and clock generators.

Referring to FIG. 3, a global positioning system (GPS) module 302 may transmit a signal to a system synchronizer 304. The system synchronizer 304 synchronizes the entire system and transmits the signal further to clock generators PLLs 306 that are communicatively coupled with a baseband processor 308 and a transceiver 310 of the IBTB. A person of ordinary skill in the art will understand that the baseband processor 308 and the transceiver 310 may be similar to the baseband processor 102-1 of FIG. 1 or 202 of FIG. 2, and the transceiver 102-2 of FIG. 1 or 204 of FIG. 2, respectively, and hence, may not be described in detail again for the sake of brevity.

Figure 4:
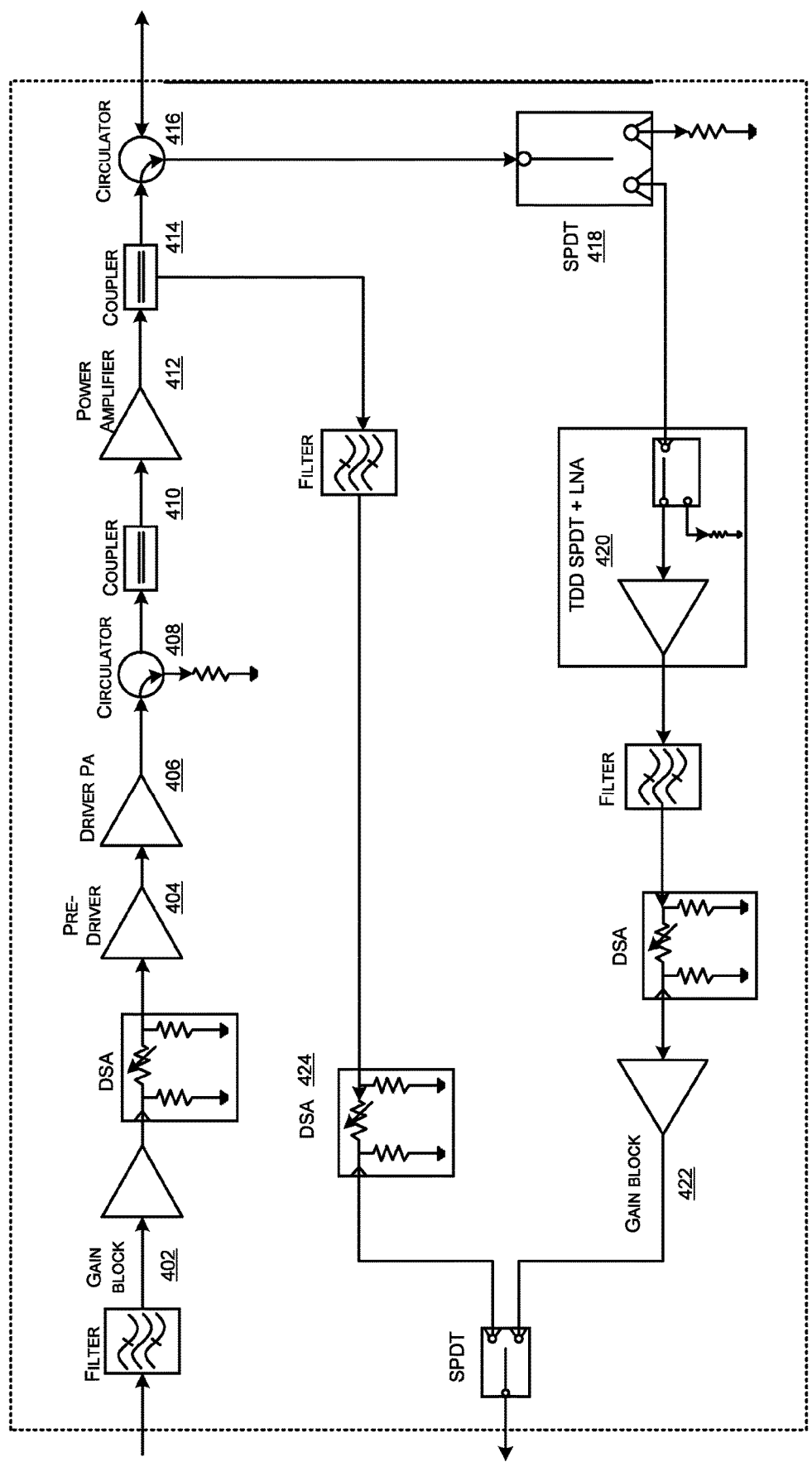
FIG. 4 illustrates an exemplary design architecture of a radio frequency front end board (RFEB), in accordance with embodiments of the present disclosure.

FIG. 4 illustrates an exemplary design architecture of an RFEB 400, in accordance with embodiments of the present disclosure. A person of ordinary skill in the art will understand that the RFEB 400 may be similar to the RFEB 104 of FIG. 1 in its functionality, and hence, may not be described again in detail for the sake of brevity.

In an embodiment, the RFEB 400 may be configured to receive control signals (RF signals) from the IBTB (for example, the IBTB 102 of FIG. 1 or the IBTB 200 of FIG. 2) along with a power supply through a connector. Further, in an embodiment, the RFEB 400 may be configured to act as a signal extended so as to incorporate 4 transmit chains for signal transmission, 4 receive chains for signal reception, and 4 observation chains that can act as DPD feedback paths from PAs to a transceiver (for example, the transceiver 102-2 of FIG. 1 or the transceiver 204 of FIG. 2) for linearization.

In an embodiment, each transmit chain may be configured to carry matching balun, pre-driver amplification (402, 404), driver amplification 406, and final RF power amplification 412 as part of the final stage of power amplification (PA). In an embodiment, each transmit chain may include circulators (408, 416) and couplers (410, 414).

In an embodiment, each receive chain, on the other hand, may be configured to carry low noise amplifier (LNA) band pass SAW filter and matching network 420. In an embodiment, each receive chain may also include necessary gain blocks 422. In an embodiment, each observation chain may be configured to carry directional coupler (410, 414), digital step attenuator (DSA) (424), and matching network.

In an embodiment, the RFEB 400 may include an RF TDD switch 418 that can combine each transmit-receive pair. In an embodiment, the switch 418 may be a single pole double throw (SPDT) switch. A person of ordinary skill in the art will understand that the SPDT switch may refer to a switch that can be on in both positions, switching on a separate device in each case. In an embodiment, circulator 416 and cavity filter(s) may be used between each RF switch to antenna port.

In an embodiment, the RFEB 400 may be developed on multilayer substrate that uses embedded copper coin technology for high power GAN amplifier to deliver 200 W output power thermal efficiently. In an embodiment, the RFEB 400 blind mates with the IBTB (for example, the IBTB 102 of FIG. 1 or 200 of FIG. 2) and cavity filter (for example, cavity filter 106 of FIG. 1), thus removing the complexity of cable routing to avoid RF signal oscillations.

Although FIG. 4 shows exemplary components of the RFEB 400, in other embodiments, the RFEB 400 may include fewer components, different components, differently arranged components, or additional functional components than depicted in FIG. 4. Additionally, or alternatively, one or more components of the RFEB 400 may perform functions described as being performed by one or more other components of the RFEB 400.

Figure 5:
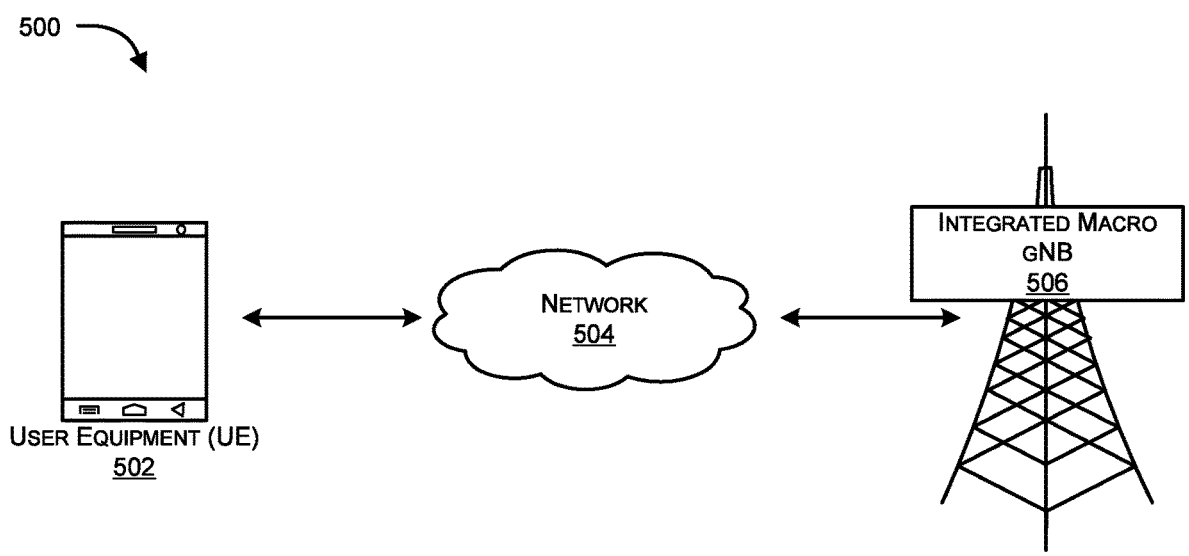
FIG. 5 illustrates an exemplary coupling representation of a user equipment with the proposed integrated next generation radio unit, in accordance with embodiments of the present disclosure.

FIG. 5 illustrates an exemplary coupling representation of a UE 502 with the proposed integrated radio unit 506. A person of ordinary skill in the art will understand that the proposed integrated radio unit 506 may be similar to the proposed integrated radio unit 100 of FIG. 1, and hence, may not be described in detail again for the sake of brevity.

As illustrated in FIG. 5, the UE 502 may be communicatively coupled to the integrated radio unit 506. The coupling can be through a wireless network 504. In an exemplary embodiment, the communication network 504 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The UE 502 can be any handheld device, mobile device, palmtop, laptop, smart phone, and the like. As a result of the coupling, the UE 502 may be configured to receive a connection request from the integrated radio unit 506, send an acknowledgment of connection request to the integrated radio unit 506, and transmit a plurality of signals in response to the connection request.

Figure 6:
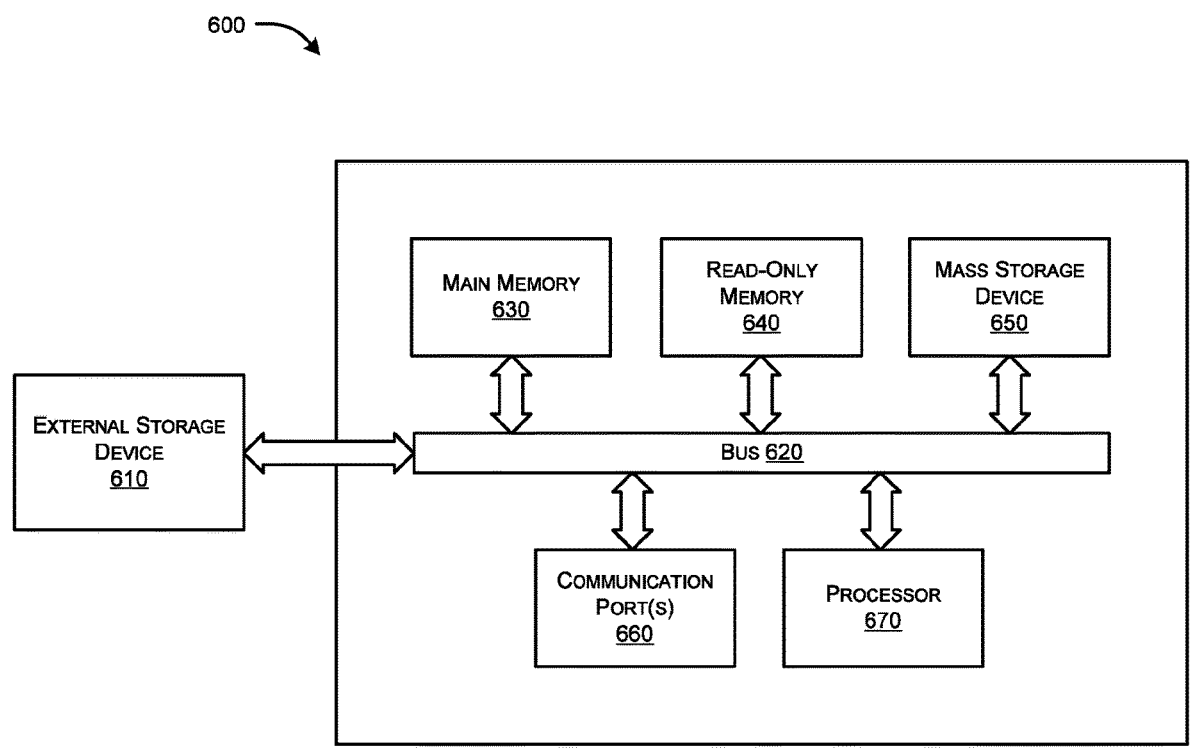
FIG. 6 illustrates an exemplary computer system in which or with which embodiments of the present disclosure may be implemented.

FIG. 6 illustrates an exemplary computer system 600 in which or with which embodiments of the present disclosure may be implemented. As shown in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor and communication port(s). The processor 670 may include various modules associated with embodiments of the present disclosure. The communication port(s) 660 may be any of an RS-232 port for use with a modem-based dialup connection, a Gigabit or 10 Gigabit port using copper or fibre, a serial port, a parallel port, or other existing or future ports. The communication port(s) 660 may be chosen depending on a network, such a Local Area Network (LAN), Wide Area Network (WAN), or any network to which the computer system 600 connects. The main memory 630 may be random-access memory (RAM), or any other dynamic storage device commonly known in the art. The read-only memory 640 may be any static storage device(s). The mass storage device 650 may be any current or future mass storage solution, which can be used to store information and/or instructions.

The bus 620 communicatively couples the processor 670 with the other memory, storage, and communication blocks. Optionally, operator and administrative interfaces, e.g. a display, keyboard, and a cursor control device, may also be coupled to the bus 620 to support direct operator interaction with the computer system 600. Other operator and administrative interfaces may be provided through network connections connected through the communication port(s) 660. Components described above are meant only to exemplify various possibilities. In no way should the aforementioned exemplary computer system 600 limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Invention

The present disclosure provides a cost-effective solution that can provide good coverage as well as capacity.

The present disclosure provides an integrated solution that meets all the radio frequency performance requirements mentioned in 3GPP standard (TS 38.141) after integrating TDD-based 5G NR Integrated Macro gNB with Crest Factor Reduction (CFR) and Digital Pre Distortion (DPD) modules in Digital Front End lineup.

The present disclosure enables low power consumption and is thermally handed properly by the IP65 ingress protected mechanical housing and PCB embedded copper coin technology to easily conduct heat through the boards.

The present disclosure provides a device/solution that provides cost and energy efficient solution to any network leading to OPEX benefits.

The present disclosure provides a 5G Integrated Macro gNB that provides an overall hardware overview of Macro gNB design for standalone mode, and is configured as an "All-in-one" unit comprising of Baseband, RF, and Antenna Units in a single closure for easy and efficient installation.

The present disclosure provides a 5G Integrated Macro gNB renders an all in one class design having PHY, MAC, and Application layer along with complete mechanical housing in one box.

The present disclosure provides a novel design approach to self-heal the system from software corruption and any other unwanted failure from software faults to help minimize on-site visit of the engineer and thereby save operating expenses (OPEX).

We claim:

1. An integrated radio unit, comprising:
   an integrated baseband and transceiver board (IBTB), said IBTB comprising at least a baseband processor, a transceiver, and a clock synchronization module; and
   a radio frequency front end board (RFEB) operatively coupled with the IBTB, said RFEB comprising one or more RF chains to receive RF signals from the IBTB, wherein the RFEB blind mates with the IBTB through one or more RF connectors.

2. The integrated radio unit as claimed in claim 1, comprising:
   one or more cavity filters; and
   an interface for one or more antennas,
   wherein the one or more cavity filters are configured between each of said one or more RF chains of the RFEB and the one or more antennas.

3. The integrated radio unit as claimed in claim 2, wherein the one or more antennas are connected to the RFEB with one or more jumper RF cables.

4. The integrated radio unit as claimed in claim 1, wherein the one or more RF chains comprises one or more transmit chains and one or more receive chains, wherein each RF chain carries matching Balun, Pre-Driver amplifier, and final RF power amplifier as final stage Power Amplifier (PA), and wherein each receive chain carries low noise amplifier band pass SAW filter and a matching network.

5. The integrated radio unit as claimed in claim 1, wherein the IBTB is configured to:
   receive an external voltage;
   down convert the external voltage to a first voltage using isolated power supply; and
   down convert the first voltage to a second voltage using non-isolated power supply.

6. The integrated radio unit as claimed in claim 5, wherein the IBTB comprises a power management integrated chipset, one or more DC-DC converters, and one or more low dropout (LDO) regulator devices for generating the first voltage and the second voltage.

7. The integrated radio unit as claimed in claim 1, wherein the IBTB is configured to self-heal from a fault generation.

8. The integrated radio unit as claimed in claim 1, wherein the IBTB comprises one or more sensors to provide a thermal profile of the IBTB.

9. The integrated radio unit as claimed in claim 1, wherein the clock synchronization module comprises a system synchronizer and clock generator circuit.

10. An apparatus comprising the integrated radio unit as claimed in claim 1.

11. A user equipment (UE) communicatively coupled with an integrated radio unit, said UE configured to:
    receive a connection request from the integrated radio unit;
    send an acknowledgment of the connection request to the integrated radio unit; and
    in response, transmit a plurality of signals,
    wherein the integrated radio unit comprises:
    an integrated baseband and transceiver board (IBTB), said IBTB comprising at least a baseband processor, a transceiver, and a clock synchronization module; and
    a radio frequency front end board (RFEB) operatively coupled with the IBTB, said RFEB comprising one or more RF chains to receive RF signals from the IBTB, wherein the RFEB blind mates with the IBTB through one or more RF connectors.

12. A non-transitory computer readable medium comprising processor-executable instructions that cause a processor to:
    receive a connection request from an integrated radio unit;
    send an acknowledgment of the connection request to the integrated radio unit; and
    in response, transmit a plurality of signals,
    wherein the integrated radio unit comprises:
    an integrated baseband and transceiver board (IBTB), said IBTB comprising at least a baseband processor, a transceiver, and a clock synchronization module; and
    a radio frequency front end board (RFEB) operatively coupled with the IBTB, said RFEB comprising one or more RF chains to receive RF signals from the IBTB, wherein the RFEB blind mates with the IBTB through one or more RF connectors.

* * * * *